United States Patent Office 3,087,584
Patented Apr. 30, 1963

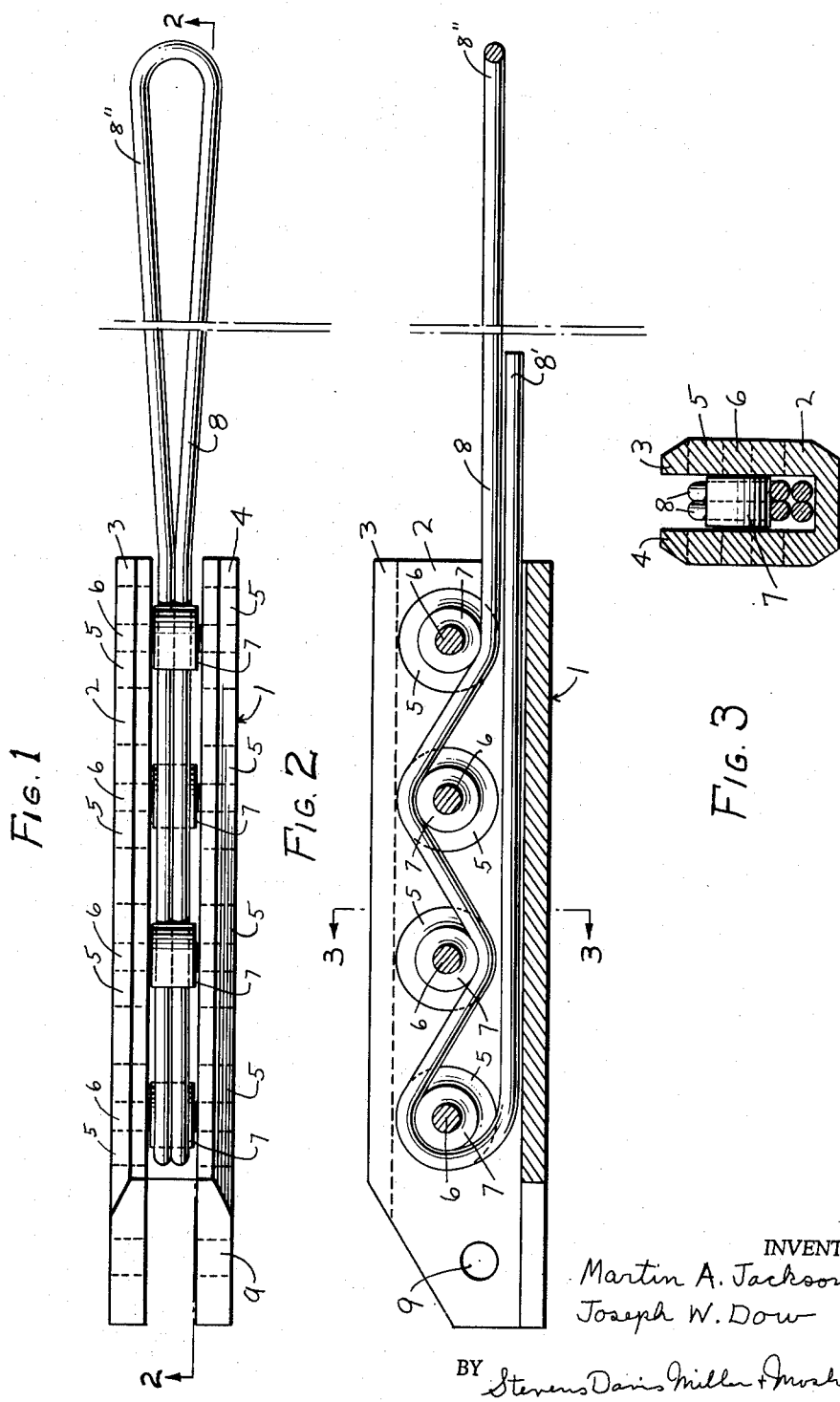

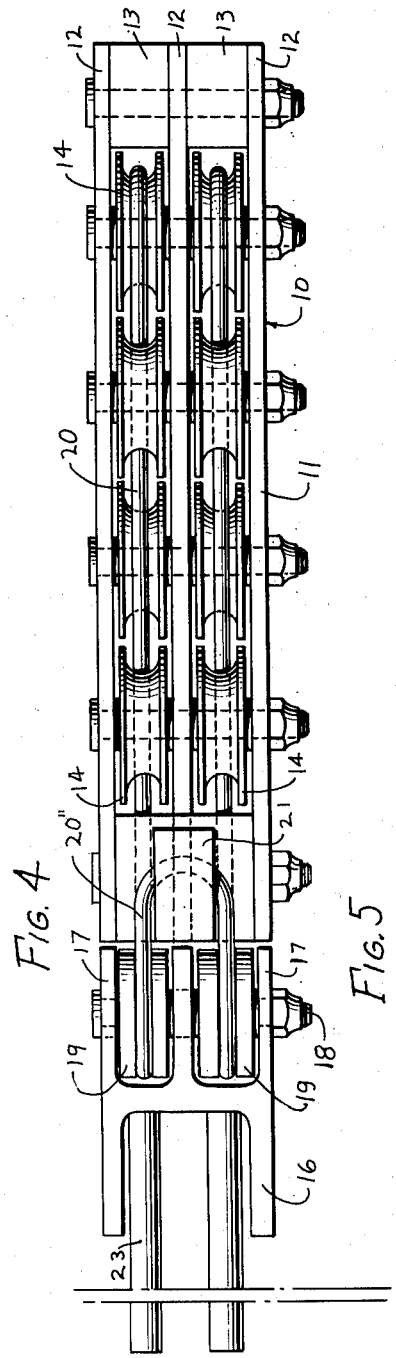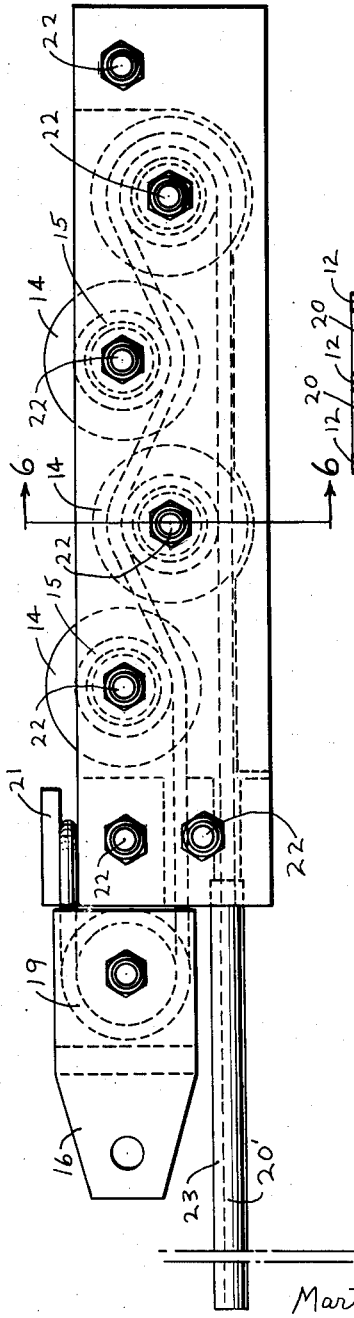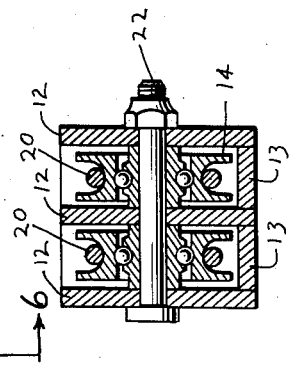

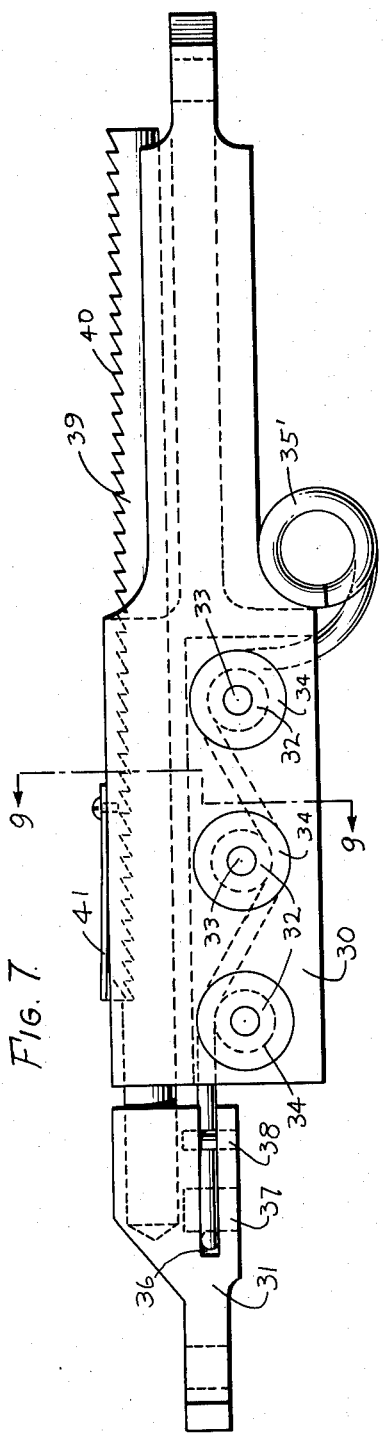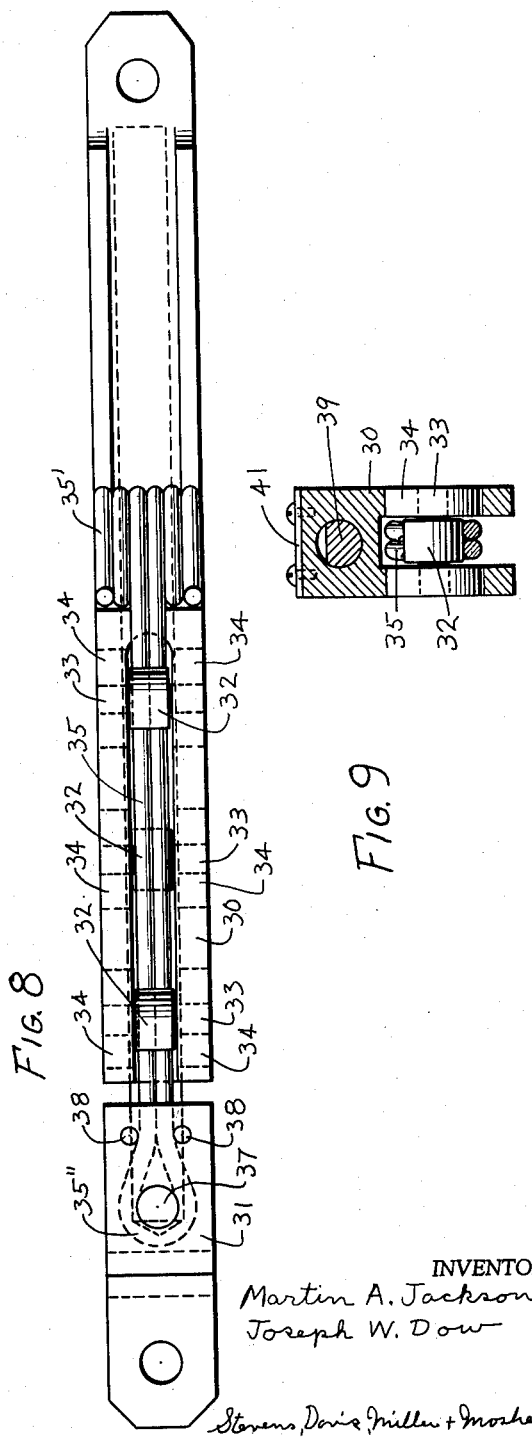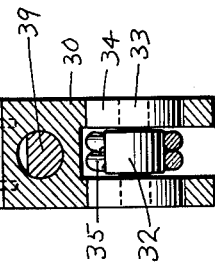

3,087,584
LOAD LIMITING SHOCK STRUT
Martin A. Jackson, Bradshaw, and Joseph W. Dow, Kingsville, Md., assignors to van Zelm Associates Inc., Baltimore, Md., a corporation of Maryland
Filed Apr. 10, 1961, Ser. No. 101,923
8 Claims. (Cl. 188—1)

This invention relates to an energy absorbing structure, more particularly, to a linear configuration of an energy absorbing structure such that the structure can be used as a shock strut or load limiting strut in many applications for equipment or personnel that are likely to be subjected to shock.

The usual expedient employed for shock absorption is some sort of a pad or spring arrangement, however, any resilient structure must obey Hook's law wherein the restoring force is proportional to the displacement. In other words, a resilient shock mount is always operating and will cause oscillation. Springs or resilient pads cannot be employed to limit load in a structure that is normally required to be rigid.

An example of one application would be the pilot seat in an aircraft wherein upon a hard landing, the pilot might be subjected to considerable shock. The pilot seat has to be firm in any adjusted position, that is, the normal position for cruising or the elevated position for take-off, landing and taxiing. If a shock strut or load limiting strut in accordance with this invention were incorporated in the structure of the pilot seat, under normal conditions and up to a predetermined load for any adjusted position of the seat, the seat would be firm. However, under a condition of hard landing, the strut in accordance with this invention would, where a predetermined load is exceeded, permit relative motion between the pilot seat and the mounting structure and would absorb the energy from the shock and cushion, to a large extent, a hard landing. However, at any time when the abnormal load is removed from the aircraft, the pilot seat will again be in a firm and fixed position and there would be no oscillation or resilience in the seat mounting structure.

Another application would be in equipment mounting cradles or dollies for shipping purposes, wherein it is desirable to protect equipment that might be damaged from shock but wherein oscillation of the equipment, if resiliently mounted, would be equally undesirable.

It is an object of this invention to provide a device which will withstand the tension load of a predetermined amount and in excess of that predetermined amount, yield at a substantially constant rate to absorb the energy of the tension load.

It is another object of this invention to provide a load limiting structure for a tension load of substantially linear design to facilitate its incorporation into the design of any equipment likely to be subjected to shock loads.

It is a further object of this invention to provide a load limiting strut of high initial resistance to shock load and constant absorption of energy in excess of the initial shock load.

It is a further object of this invention to provide a load limiting shock strut which may be readily prepared for reuse after being extended in use.

Further and other objects will become apparent from the description of the accompanying drawings in which like numerals refer to like parts.

In the drawings:

FIG. 1 is a plan view of a load limiting shock strut in accordance with this invention;

FIG. 2 is an elevational sectional view on the line 2—2 of FIG. 1;

FIG. 3 is a cross-sectional view on the line 3—3 of FIG. 2;

FIG. 4 is a plan view of another form of the shock strut incorporating features of this invention;

FIG. 5 is a side elevational view of the shock strut shown in FIG. 4;

FIG. 6 is a cross-sectional view taken on the line 6—6 of FIG. 5;

FIG. 7 is a shock strut made in accordance with this invention incorporating a non-return bracket mechanism;

FIG. 8 is a plan view of the structure shown in FIG. 7; and

FIG. 9 is a cross-sectional view taken on the line 9—9 of FIG. 7.

The shock strut 1 shown in FIGS. 1 to 3 consists of a generally U-shaped longitudinally extending frame or channel member 2. The sidewalls 3 and 4 of the channel member 2 are bored to receive ball bearings 5 at spaced locations throughout the length of the channel 2. The ball bearings 5 on opposite sides of the channel 2 are aligned to support the ends of a pin 6 extending therethrough.

In the channel 2 between the ball bearings 5 is mounted a plurality of spaced rollers 7. A wire or bendable metal rodlike member 8, bent on itself intermediate the ends thereof to form a loop 8" adjacent the bend with the portions of the rod extending from the loop positioned parallel and adjacent each other, is positioned in the channel 2. The space between the walls of the channel is slightly in excess of the axial length of rollers 7 providing clearance for free movement thereof. The axial length of rollers 7 is approximately twice the diameter of rod 8. The free ends 8' of rod 8 are inserted through the left-hand end of channel 2 as shown in FIG. 2 and bent over end roller 7 and laid along the top of channel 2. Alternate pins 6 are then removed to facilitate the removal of alternate rollers 7. Rod or wire 8 is bent down between the other set of alternate rollers 7 a sufficient amount to replace the rollers 7 and pins 6. The looped or bent portion 8" adjacent the bend of the rod or wire 8 then extends beyond the channel to accommodate the particular application or stroke characteristics required of shock strut 1. A mounting hole 9 is afforded on the other end of channel 2 to secure shock strut 1 to the structure in which it is incorporated. It can be seen, therefore, from an inspection of FIGS. 1 to 3, that if shock strut 1 is connected between two relatively movable portions of a structure, channel 2 being connected onto one portion of the structure and the looped end of the rod or wire 8" connected to another portion of the structure to be supported, as the shock occurs in excess of a predetermined amount, that the rod or wire 8 will start to pull itself or to be pulled through the rollers 7 and the tension energy of the load will be absorbed as successive increments of wire 8 are bent around rollers 7. The amount of energy absorbed in the bending will depend upon the physical properties of the wire and the radius of the rollers. The number of rollers can be varied, thus varying the amount of energy being absorbed in the stroke of the strut.

It will be noted that the physical proportions of the channel are such that it can be readily incorporated into structural designs mentioned in the examples above by reason of its linear design.

After a load limiting strut has been used to absorb energy from one shock, a new rod or wire can be inserted as described above to ready it for the next application of load.

In shock strut 10 shown in FIGS. 4 to 6, an embodiment is shown in which the energy absorption capabilities are doubled, but the linear, compact design is maintained. Roller support member 11 is formed by plate members 12.

Intermediate space members 13 form, with plate members 12, channels in which rollers 14 are positioned in a longitudinal arrangement. Rollers 14 are mounted on bearings 15.

Abutting one end of roller support assembly 11 is a roller bracket 16 formed with roller support members 17. A through bolt 18 retains rollers 19 in bracket 16.

A rod or wire 20 is bent intermediate ends 20' thereof and bent portion 20" is secured around lug 21 on roller support member 11. Rod or wire 20 can be easily positioned around rollers 19 and 14 and in the channels formed in roller support member 11 by removal of bolts 18 and 22. The free end 20' or rod or wire 20 may be encased and protected by tubes 23 mounted on roller support member 11.

The double load is obtained in this arrangement by the usual "block and tackle" action between the two relatively movable support support members 11 and 16 and the rod or wire 20 securing them together.

The operation and application of this embodiment is the same as described above. The strut will be incorporated in structure to mount a load likely to be subjected to shock. Bracket member 11 may be mounted on the fixed support and bracket member 16 on the relatively movable load supporting structure. Upon impact, in excess of a predetermined amount, the rod or wire will be pulled over the rollers and will yield to the load at a constant amount, the energy being absorbed by the bending of successive increments of the rod or wire.

In the embodiment illustrated in FIGS. 7 to 9, brackets 30 and 31 operate similarly to the brackets described above. Rollers 32 are mounted on pins 33, the ends of which are supported by bearings 34 in the side walls of bracket 30 similar to FIGS. 1 to 3 above. The roller supporting frame 30 and bracket 31 are positioned end to end to maintain the linear design.

A bent rod or wire 35 is formed with a looped portion 35", within loop is retained in slot 36 in bracket 31 by pins 37 and 38. The adjacent, parallel portions of the rod or wire 35 are threaded through rollers 32 as described above by the removal of pins 33 and rollers 32. The excess length of rod or wire 35 may extend outwardly and angularly of the frame 30 and may be coiled up adjacent the side of the frame as shown at 35'.

A ratchet rod 39 is shown secured in bracket 31 and extending through frame 30. The ratchet teeth 40 on rod 39 are engaged by pawl 41 mounted on top of frame 30 to preclude any return movement of the load, should there be any tendency so to do, after an impact or shock having been absorbed.

The term "rod or wire" has been used throughout this specification as meaning an elongated pieces of bendable metal. The rod or wire may have may have any cross-sectional shape. In the claims the term "rod" or "rod-like member" will be relied upon to characterize this element.

From the foregoing, it will be seen that a linear design of a load limiting shock strut is provided that is capable of many applications and while three embodiments are disclosed, it is to be understood that other embodiments are possible within the scope of the appended claims.

What is claimed is:

1. A load limiting shock strut comprising a longitudinally extending frame having spaced side members forming channel means open at the one side thereof, a plurality of roller means arranged longitudinally of said frame and extending between said side members, the axial length of said roller means being substantially equal to the distance between said side member, a metal rod-like member bent intermediate the ends thereof forming a loop adjacent the bend therein comprising the load-supporting means of said rod-like member, the portions of said rod-like member on each side of the loop being arranged parallel and adjacent one another, both said parallel portions of said rod-like member being positioned in said frame and extending along one side of said plurality of roller means, both said portions further extending around the end roller means of said plurality of roller means and deformed into contact along opposite sides of successive alternate roller means of said plurality of roller means and then to said loop the load-supporting loop means of said rod-like member extending therefrom beyond one end of said frame member.

2. The load limiting shock strut as set forth in claim 1 in which means are provided for removal of said roller means to enable the insertion of said rod-like members through the open side of said channel means.

3. The load limiting shock strut as set forth in claim 1 in which said roller means are supported on removable pivot means arranged transversely of said frame.

4. A load limiting shock strut comprising, a longitudinally extended frame structure having spaced, parallel side wall members forming longitudinal channel means therein, a plurality of spaced roller means of equal length carried by and journalled between said parallel side wall members, the transverse spacing of said side wall members being slightly in excess of the axial length of said plurality of roller means, a bendable metal rodlike member having a bend therein intermediate its length forming a load-supporting loop from which extend two parallel and adjacent positioned portions of said rodlike member, the free ends of which are adapted to extend outwardly of said frame structure, both said parallel and adjacent portions of said rodlike member extending within said channel means and in contact with opposite sides of alternate successive roller means, the load supporting loop being disposed beyond one end of said frame, said frame having means adapted for attachment to structure responsive to shock induced movement.

5. The load limiting shock strut as set forth in claim 4 wherein said two parallel and adjacent portions of said metal rodlike member extend outwardly and angularly of said frame structure, the said free ends of the rodlike member being disposed in coiled form contiguous said frame structure.

6. The load limiting shock strut as set forth in claim 4 wherein the said free ends of said two parallel and adjacent portions of said metal rodlike member extend engagingly around an end roller means of said plurality of roller means to reversely extend within said channel means and towards said load-supporting loop of said rodlike member.

7. The load limiting shock strut as set forth in claim 1 wherein a bracket member is positioned adjacent said one end of said longitudinally extending frame, roller means mounted on said bracket member, lug means on said frame, said both rodlike portions extending partly around said roller means on said bracket member, said load supporting loop means being anchored on said lug means.

8. The load limiting shock strut as set forth in claim 4 in which the load-supporting portion of said rod-like member is secured in a bracket member aligned with said frame, a ratchet and pawl means secured to said bracket member and said frame to maintain the relative positions reached therebetween after the application of a shock load.

References Cited in the file of this patent

UNITED STATES PATENTS

| | | |
|---|---|---|
| 643,575 | Walker et al. | Feb. 13, 1900 |
| 2,578,903 | Smith | Dec. 18, 1951 |
| 2,682,931 | Young | July 6, 1954 |